Figure 1:
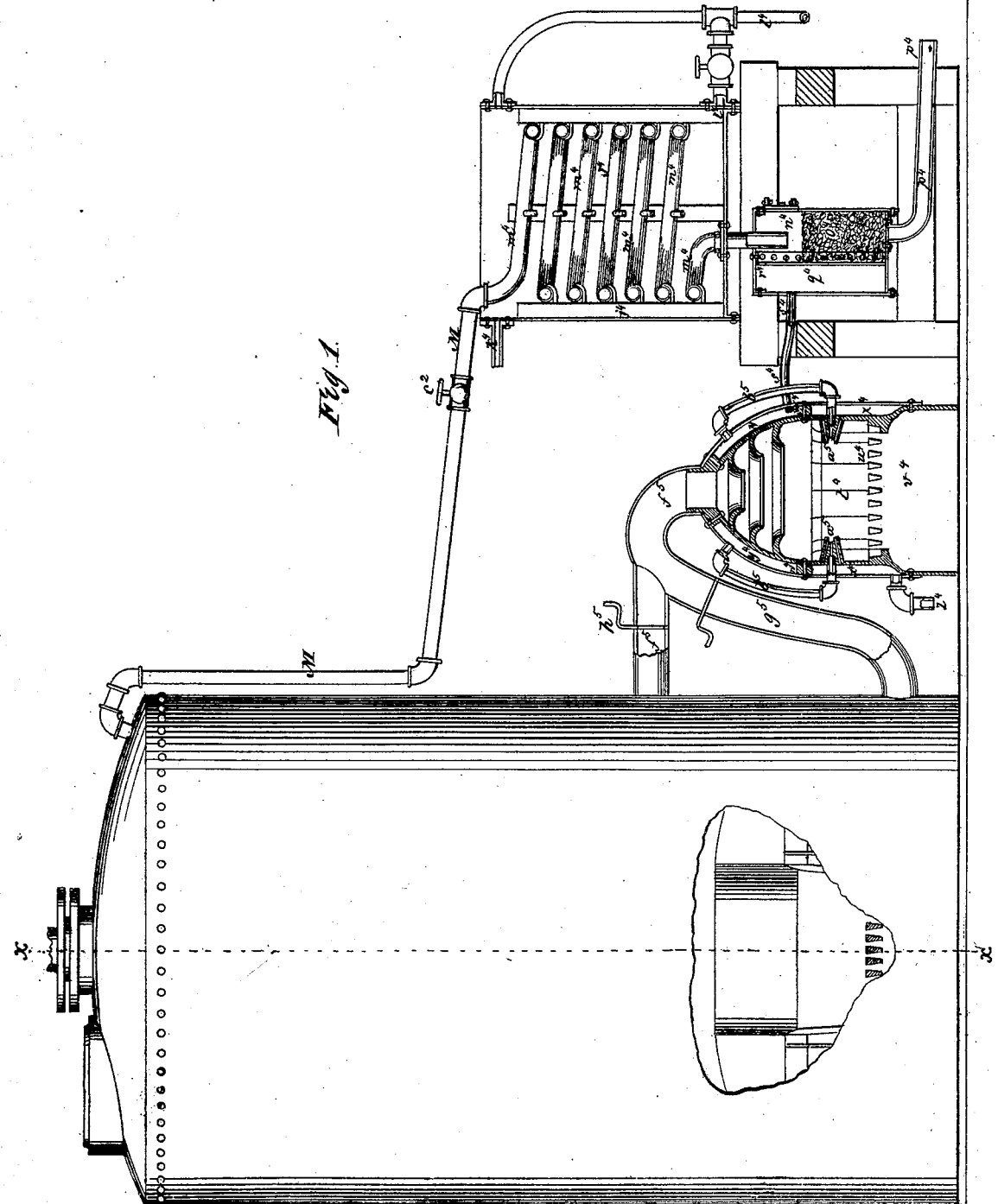

C. G. BRUCE & M. J. STEIN.
Improvement in Process and Apparatus for Rendering and Drying Animal Matter.

No. 132,242. Patented Oct. 15, 1872.

Witnesses:
L. Wolff
J. Felbel

Inventor:
C. G. Bruce and
Michael J. Stein.
By atty. J. N. McIntire.

3 Sheets--Sheet 2.
C. G. BRUCE & M. J. STEIN.
Improvement in Process and Apparatus for Rendering and Drying Animal Matter.
No. 132,242.     Fig. 2     Patented Oct. 15, 1872.
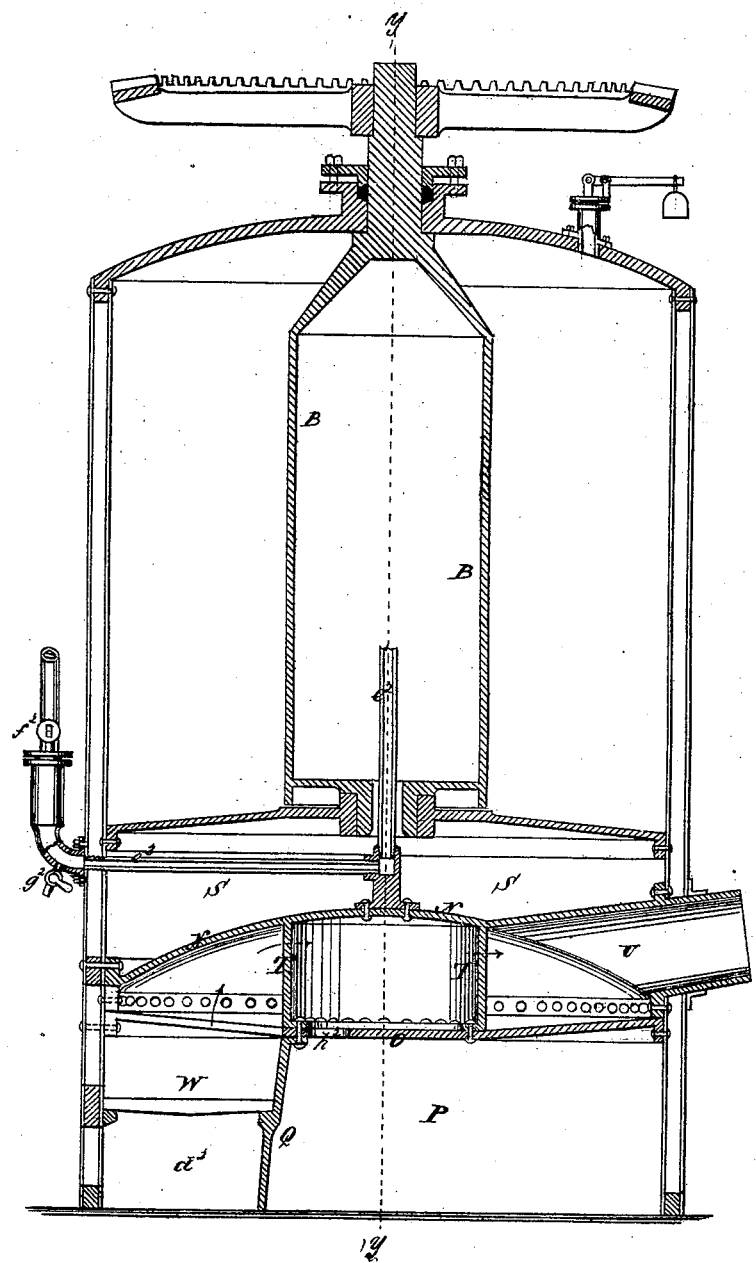
Witnesses:
E. Wolff
J. Felbel
Inventor:
C. G. Bruce and
Michael J. Stein.
By atty. J. N. McIntire.

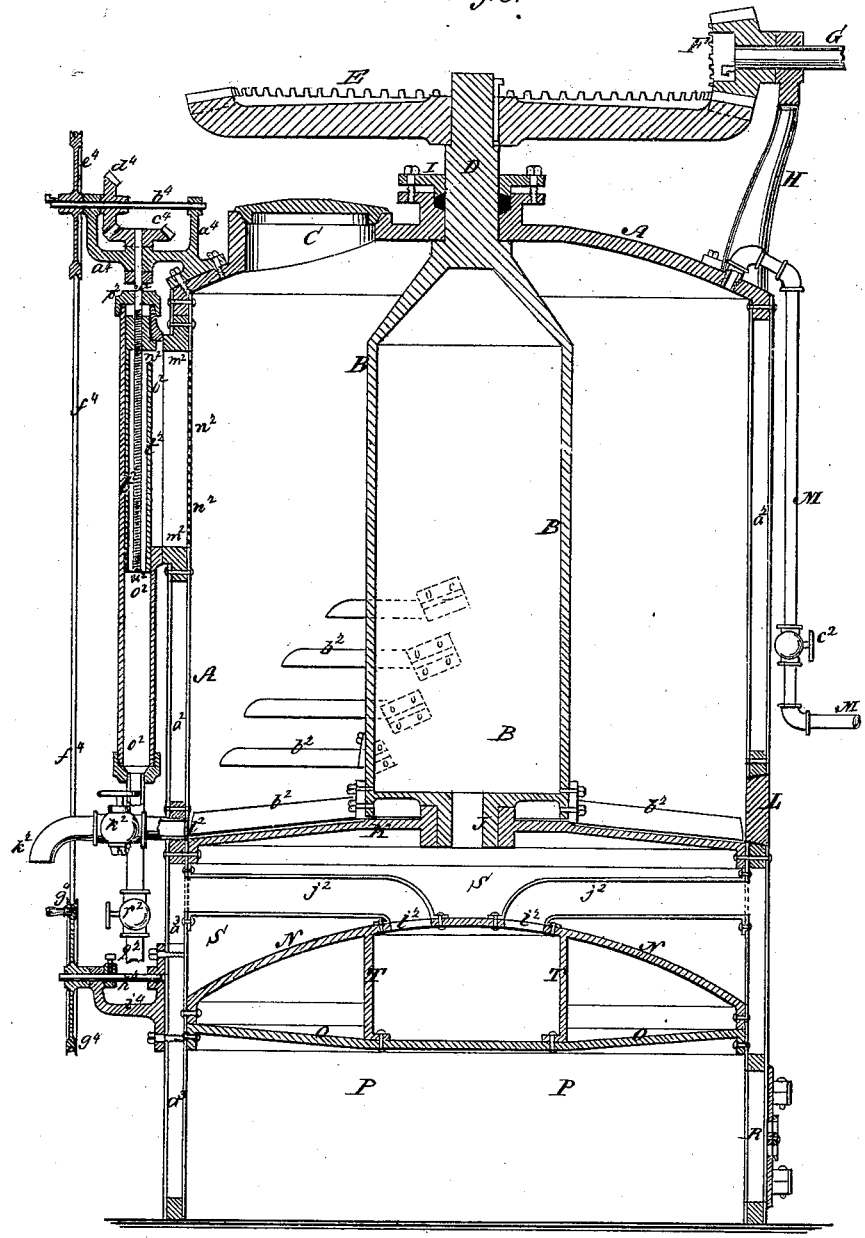

UNITED STATES PATENT OFFICE.

COSMORE G. BRUCE AND MICHAEL J. STEIN, OF NEW YORK, N. Y.

IMPROVEMENT IN PROCESSES AND APPARATUS FOR RENDERING AND DRYING ANIMAL MATTER.

Specification forming part of Letters Patent No. 132,242, dated October 15, 1872.

*To all whom it may concern:*

Be it known that we, COSMORE G. BRUCE and MICHAEL J. STEIN, of New York city, in the State of New York, have invented an Improved Process and Apparatus for Rendering and Drying Animal Matter; and we do hereby declare that the following is a full and exact description thereof, reference being had to the accompanying drawing making part of this application.

In the treatment of all kinds of animal matter, to extract the fat and convert the residuum into a guano or fertilizer, it has become a great desideratum to perform the processes of rendering out the fat, and drying and pulverizing the "scrap," continuously, and without exposure of the material to the external atmosphere, for which process Letters Patent were granted to Michael J. Stein on the 26th of March, 1872, and numbered 125,112.

The main advantages of treating the material by a continuous process, while confined in a close vessel (which are fully set forth in the patent just alluded to) are, the retention of all the nitrogen or ammonia in the scrap, the prevention of any nuisance by the escape of noxious gases, and the great economy of the process. Various methods and apparatus have been devised for the accomplishment of the ends alluded to, with more or less success in practical operation.

Our present invention has for its main objects to overcome some of the practical difficulties encountered in the methods so far known and used for treating animal matter by a continuous process, or succession of processes, while confined in a close vessel, and consists in the use, in connection with a close rendering and drying vessel provided with suitable means for heating it up, of an auxiliary gas-consuming furnace, so combined or arranged with the rendering and drying chamber and its furnace that, while the gases generated in the tank can be passed into and consumed in said auxiliary furnace, the products of combustion from the latter may be either allowed to pass off or be carried into the main furnace and utilized in the carrying on of the rendering process, as will be hereinafter more fully described; and our invention further consists in making a rendering and drying vessel or chamber with a surrounding hot-air wall or space, and an internal steam-heated drum or hollow shaft, (or series of hollow shafts,) whereby we are enabled to utilize the more intense heating-medium at that locality at which the steam heat is least useful, as will be hereinafter more fully explained; and our invention further consists in an apparatus so constructed as to be capable of generation within itself of both the dry heat and the steam heat for supplying the radiating surfaces, as will be presently more fully described; and our invention further consists in a vertically-arranged rendering and drying tank provided with an internal steam-heated shaft and agitating and disintegrating arms, as will be hereinafter more fully described; and our invention further consists in a vertically-arranged tank provided with a suitable means for heating it up, in combination with means for separating and drawing off the liquid fat and water, as will be hereinafter more fully explained; and our invention further consists in certain hereinafter-described improvements of construction of the apparatus for conducting the gas-consuming and rendering and drying processes, as will be described.

To enable those skilled in the art to make and use our invention, we will proceed to more fully explain the construction and operation of our improved apparatus or machinery, referring by letters to the accompanying drawing, in which—

Figure 1 is an elevation of the entire apparatus, showing the condenser and gas-burner in section; Fig. 2 is a vertical section at the line $x\,x$ of Fig. 1; and Fig. 3 is a vertical section at the line $y\,y$ of Fig. 2.

In the several figures the same part will be found designated by the same letter of reference.

A is the rendering and drying chamber or vessel which is cylindrical in shape and vertically placed or arranged. It is formed shell-like, or with a surrounding space, $a^2$, (which is supplied with hot air) and solid heads or ends, in the upper one of which is formed an ordinary man-hole, C, through which the material to be treated is introduced. The lower head K (or bottom) of said vessel A is formed with a central opening or eye, in which is formed a bearing for the hollow-journal J of the steam-drum, or vertical hollow-shaft B, which has a solid journal, D, at its upper end, extending through the top or upper head of vessel A, and provided at its extremity with the driving bevel-gear E, with which engages the bevel-pinion F; the latter is keyed to the main driving-shaft G, which is mounted in a stand, H, bolted to the top of vessel A, and the journal D (where it passes through the top or upper head of vessel A) is provided with a suitable stuffing-box, I. The hollow rotary drum or shaft B is provided with helically-arranged arms $b^2$, which serve to disintegrate the mass of material during the drying operation. L is the man-hole through which the contents of vessel A may be discharged, and M is a pipe leading from the upper end of the chamber A to the condenser, for purposes to be presently explained; it is provided with a stop-cock at $c^2$, as shown. The cylindrical shell portion of the vessel A is extended downward some distance below the lower head K, as seen at $a^3$, so as to form an auxiliary cylindrical chamber, in which are located a furnace, boiler, and certain hot-air spaces and flues, which will be presently described. This auxiliary cylinder is divided horizontally, by dish-shaped partitions or diaphragms N and O, into three compartments, the lower one of which, P, (except a portion cut off by the vertical partition Q to form the fire-chamber and ash-pit of the furnace) constitutes the receiving air-chamber, and is supplied with fresh air through the door R, or a damper or register therein; while the upper one constitutes a water-reservoir or boiler to contain the water from which steam is generated to supply the hollow (steam-heated) shaft or drum B. Between the diaphragms N and O is arranged centrally a vertical cylindrical wall or shell, T, around which pass the products of combustion from the furnace to the exit flue or passage U leading to the chimney, and through said cylinder T pass the currents of air (supplied from the chamber P) into conducting pipes or flues V V, which lead to and communicate with the hot-air space $a^2$ and $a^3$ of the cylindrical vessel A. In that part of the lower chamber which is partitioned off by plate Q is located the furnace W and its ash-pit $d^2$, from which, as before remarked, the products of combustion pass off by the flue U, surrounding the cylinder T, as indicated by the arrows in the drawing. $e^2$ is a tube extending from the steam-space in drum B to a safety-valve at $f^2$, and provided with a cock at $g^2$, for drawing any accumulation of water of condensation which may occur therein. $h^2$ represents one or more holes in the horizontal partition O, through which a communication is formed between the interior of cylinder T and the air-reservoir P, and $i^2$ are similar holes in plate N, by which the communication is continued into the flues $j^2$, which, as already stated, communicate with the hot-air space $a^2$. Thus a free passage of the air admitted to chamber P is permitted, through cylinder T and pipes $j^2$, into the hot-air space which surrounds the vessel A, for purposes to be fully explained. On one side of the vessel A, near the top, is provided a means or device for drawing off the liquid fat resulting from the rendering process, and near the bottom of chamber A is located a suitable stop-cock, $K^2$, for drawing off the water. This water-faucet should be provided with a suitable strainer or filter at $l^2$, to prevent its getting clogged. The means or device for drawing off the liquid fat I will now describe more fully: At $m^2$ is an opening, slot-like, in the case or body of the vessel A, which opening is provided, where it communicates with the interior of chamber A, with a perforated plate or strainer, $n^2$, which permits all liquid matter near the upper portion of the charge (but no solid matter) to flow through and into said open space $m^2$, and this space $m^2$ communicates with or opens into a hollow shaft or chamber, $o^2$, arranged, as seen in the drawing, on the outside of vessel A; this chamber $o^2$ is closed by a cap, $P^2$, at its upper end, but at its lower end connects with a pipe, $q^2$, leading off to the fat-receptacle; this pipe has a stop-cock at $r^2$. Within the chamber $o^2$ is arranged, so as to slide freely endwise, a tube, $t^2$, which, at its lower end, opens into chamber $o^2$, while it cuts off the communication between said chamber and the opening $m^2$, except at the point $w^2$, where a passage-way is formed through the tube $t^2$ and thence into chamber $o^2$. The tube $t^2$ is mounted, as shown, on a vertical screw-shaft, $u^2$, and is so arranged thereon that by the turning of said shaft $u^2$ said tube $t^2$ will be moved up or down, according to the direction of rotation of said shaft. $a^4$ is a stand bolted to the top of case A, and provided with suitable bearings for the upper end of shaft $u^2$, and for a horizontal shaft, $b^4$, and on these two shafts are keyed, respectively, the bevel-gears $c^4$ and $d^4$, which mesh together, as shown. $e^4$ is a pulley on the outer end of shaft $b^4$, belted by a band, $f^4$, to the pulley or hand-wheel $g^4$, which is fast on the end of a shaft, $h^4$, mounted in the stand $i^4$, which is located at a convenient height for the manipulation by the attendant of the hand-wheel $g^4$. As before remarked, the pipe M leads from the top of vessel A to the condenser. This pipe serves to carry off from the chamber A the vapors and gases which are therein generated, for the ultimate destruction of them.

The condenser is composed of a tank or vessel, $j^4$, (see Fig. 1,) which is constantly supplied with cold water, which runs in at $k^4$ and discharges at $l^4$, keeping the tank always about full, and a coil, $m^4$, connecting at its upper end to pipe M and leading at its lower end into the chamber $u^4$ of a filter. This filter is provided at the lower portion of its chamber $u^4$ with suitable filtering and deodorizing materials, $o^4$, for the cleansing of the waters of condensation, (which pass off at $p^4$,) and with an auxiliary chamber or compartment, $q^4$, into which the gases and non-condensible vapors pass through the hole $r^4$. From this gas-receiver or auxiliary chamber $q^4$ extends a tube or pipe, $s^4$, through which the gases pass to the gas-chamber of a gas-burning furnace, which I will now describe.

This furnace is composed, as shown, of a suitable fire-chamber and grate, $t^4$ $u^4$, ash-pit $v^4$, and appliances for the perfect consumption of gases supplied to it. The body and dome-like portions of this furnace are made, as shown, with hollow walls or shell-like, and divided by a horizontal partition at $w^4$ into two compartments, $x^4$ $y^4$, one of which is supplied with air (hot or cold, or other gas, as may be found expedient) through a tube, $z^4$, and the other with the noxious gases and non-condensible vapors from the pipe $s^4$. Around the fire-chamber $t^4$ are arranged a series of Argand burners, $a^5$, made according to an invention already patented to Michael J. Stein, and the detail of construction of which need not here be further explained than that they have each three passages; the lines of direction of which converge toward a point located within the fire-box of the furnace and a short distance from the burner itself. The central one of the passages of the burner is supplied through a tube, $b^5$, with gas from the chamber or space $y^4$, and the other two passages of the burner are supplied with air from the chamber $x^4$. Within the dome of the furnace are arranged a series of circular dished rings, $c^5$ $d^5$ $e^5$, which serve as deflectors to aid in the perfect combustion of all the gases, as will be presently more fully described. $f^5$ is the pipe for carrying off the products of combustion to the chimney of the rendering and drying apparatus. It is provided with a damper at $h^5$, and between this damper and the furnace there is located a branch-pipe, $g^5$, also provided with a damper, $i^5$, which passes into the ash-pit $d^2$ of the furnace W of the rendering and drying tank. By this arrangement of flues and dampers it will be seen that the heat and all products of combustion escaping from the auxiliary furnace, just last described, may be either allowed to pass off unused to the chimney, or they may be forced into the furnace of the rendering and drying tank, and there utilized as occasion may require. $m^5$ is an overflow-pipe, so arranged on the condenser tank that, in the event of the supply of water being greater than the capacity of the discharge or exit pipe, it will carry off, at the top of the tank, the surplus water and prevent an overflow of the tank.

With the foregoing description of the several parts, and of the construction, of the apparatus, the following will answer to make clear, to those skilled, the operation of our improved machinery for rendering and drying all sorts of animal matters, to extract the fat and convert the solid matter into a fertilizer, without the loss of the desirable chemical qualities of the matter or the escape of any noxious gases or vapors.

The vertically-arranged tank or vessel A is charged in the usual manner through the man-hole C, and is then hermetically sealed. The products of combustion from the fire-chamber W (see Fig. 2) surround the cylinder T, filling the space outside of said cylinder, between the two diaphragms N and O, and highly heating the said cylinder and diaphragms. The air which is fed into the lower chamber P passes up through cylinder T, and thence through pipes $j^2$ to the space $a^2$ surrounding the vessel A. In its passage the air becomes highly heated, and by it the cylindrical surface of the vessel A may be heated up to any required temperature. At the same time, by the same fire, the water in the boiler-space S is heated up and steam generated, and, if desired, superheated, which fills the drum B and heats it up to the desired or requisite temperature; and by the combined action of the steam and dry heat supplied from the highly-heated jacket $a^2$ and from the steam-heated central shaft or drum B the contained mass is subjected to the rendering process, and all its fat reduced to a liquid condition. During this rendering process the steam and noxious vapors generated within the vessel A pass off through the pipe M—their only means of escape—to the condenser.

When all the fat has been rendered out, and it is desired to separate it and other liquid matter from the solid portion of the contained charge, the attendant adjusts the sliding tube $t^2$ (see Fig. 3) so that its opening at $W^2$ is on a level with or below the level of the liquid fat, which then runs into the chamber $O^2$, and thence through tube $g^2$, off to the receptacle provided for it, the cock $r^2$ having been opened. As the liquid fat is drawn off, the tube is continuously moved down by turning the hand-wheel $g^4$, which, through the medium of belt $f^4$, wheel $e^4$, and gears $c^4$ $d^4$, turns the screw-shaft $u^2$, as before described, until it is observed that the level of the water is approached or reached, when the cock $r^2$ is closed, the fat-drawing ceased, and the cock $k^2$ is opened to allow all the water and mixed liquid (that will) to run off from the bottom of vessel A. When all the water is drawn off, the cock $k^2$ is closed and the drying operation then goes on, during which the rotary steam-heated drum is put in motion, and by the action of its stirrers $b^2$ keeps the mass of solid matter in a constant state of agitation, and perfectly disintegrates and rapidly dries it by subjecting it to the action of the combined steam and dry heated surfaces of the vessel and drum. When completely dried and pulverized, in the case of such animal matter as contains no hard material requiring subsequent grinding, the man-hole L may be opened, and the finished fertilizer or dry scrap discharged in a condition ready for the market and immediate use.

The scrap thus treated will be found to possess great richness, and this process of manufacture, it will be seen, may be conducted in cities and thickly-populated districts with the apparatus herein described, as no noxious gases can escape or other nuisance occur, since during the drying process or operation, as well as during the rendering, the consumption of all such gases is completely effected; and it will be understood that, in conducting the continuous process as described in our improved apparatus, not only the serious objection to the introduction of a supply of water to float off the fat rendered out, whereby the gluten and sediment of the contained charge are stirred up and intermingled with the oil, is entirely overcome, but the fat and water are separately extracted from the chamber, while it is allowed to very slightly cool down, merely to stop the boiling, and thus the waste of heat and fuel consequent to a cooling off and reheating to go on with the drying process, is entirely avoided, which is a great desideratum.

In lieu of the objectionable method of lifting or floating off the fat by flooding the chamber with water, whereby much of the matter which should remain in the vessel is mixed up in the fat, and the whole operation made expensive, and the machinery complex, we simply run off the clear fat, then the water, and then continue on with the drying operation.

It is a well-known fact among fat-melters that, when the charge is thoroughly heated up and the requisite amount of pressure obtained, a slow and steady fire or regular heat is most to be desired, and that also during the first hours of the process most of the noxious gases are generated; hence it is at this time that the hottest fire is required to destroy them, making very apparent the great utility and economy of our auxiliary furnace for effecting their destruction by combustion, and the advantage of having said furnace so combined with the rendering-tank that it may be used to aid a slow fire in the main furnace or as a substitute for such fire. In the discharge of the finished material the rotation of the hollow shaft with its arm $b^2$ will tend to rapidly clear out the material and clean the vessel A of its contents. All the vapors and gases which are generated during the rendering and drying operations (or either) pass along the pipe M to the condenser; here the condensable vapors are separated from the non-condensable vapors and gases and flow through the filter in the form of water, and make their escape while the non-condensible vapors and noxious gases pass on to the destroying or consuming furnace. The water which passes through the filter may be subjected to any sort of filtering and deodorizing process which may be found expedient or necessary. All the gases and vapors which pass to the condensing-furnace go into the upper end of the two surrounding chambers, and from there are fed or pass to the central passages of the Argand burners, where in their escape they meet currents of air (or any other gas which may be found useful for the purpose) and, mingling therewith in the fire-box of the auxiliary furnace, a complete combustion occurs, by which all such gases are consumed or so chemically changed that no unpleasant odors will escape.

The object and advantage of the series of annular deflectors in the furnace (already described) are to prevent the ready escape of any gas which might not be immediately consumed on entering the fire-chamber and produce a deflection or reverberation of them, which will insure their complete combustion before they can reach the smoke-pipe. These deflectors, it will be seen, are arranged so as to act successively on any ascending currents.

To insure, beyond the possibility of a doubt, the complete consumption or destruction of the gases they may be passed into the furnace of the rendering and drying chamber.

It will be understood that one or more of the features of our invention may be employed with more or less advantage without the adoption of the whole, and it will be understood that some of our improvements may, with great facility, be applied to or incorporated in some of the apparatus already in use — for instance, by the application of a suitable stirring and disintegrating device, &c., to some of the old-fashioned vertical rendering or boiling tanks now in use—and putting on suitable appliances to drive the stirrers. Such old-fashioned tanks may be utilized to constitute a tolerably good apparatus for carrying on the drying as well as the rendering operation.

Having fully described the construction and operation of our improved apparatus, what we claim therein as new, and desire to secure by Letters Patent, is—

1. The use, in connection with a closed rendering-vessel, of an auxiliary furnace so arranged and operating that the gases generated in the tank may pass to said furnace, and the products of combustion of said furnace may be passed into the furnace of the rendering and drying apparatus, as and for the purposes hereinbefore described.

2. A rendering-vessel formed with a surrounding hot-air space and provided with an internal steam-heated drum, (or flues,) whereby the cylindrical jacket may be heated by hot air, while steam is used as the heating-medium of the internal heating-surfaces, substantially as and for the purposes set forth.

3. A rendering apparatus in which are provided means for generating both the steam to supply the steam-heated surfaces, and hot air to supply the flue-spaces or hot-air jacket, substantially as described.

4. The vertically-arranged rendering and drying tank in combination with the rotary central shaft and agitators, the whole constructed to operate substantially as described, for the purposes set forth.

5. A rendering-tank arranged vertically over a suitable furnace, when provided with an internal steam-heated shaft or drum and means for separating and drawing off the liquid fat and water, substantially as described.

6. A gas-consuming furnace constructed with a subdivided surrounding gas and air chamber and Argand burners, the whole arranged to operate substantially as shown and described.

7. The combination, with the fire-box and Argand burners of the auxiliary furnace, of a series of annular deflectors, arranged to operate in the manner and for the purposes described.

8. The arrangement of the pipes which conduct the hot air to the jacket of the vessel A within the water-space of the boiler, substantially as and for the purposes described.

In testimony whereof we have hereunto set our hands and seals this 9th day of October, 1872.

COSMORE G. BRUCE. [L. S.]
MICHAEL J. STEIN. [L. S.]

In presence of—
JACOB FELBES,
GEO. S. GREENSWARD.